(12) United States Patent
Baruch et al.

(10) Patent No.: US 9,741,125 B2
(45) Date of Patent: Aug. 22, 2017

(54) METHOD AND SYSTEM OF BACKGROUND-FOREGROUND SEGMENTATION FOR IMAGE PROCESSING

(71) Applicant: INTEL CORPORATION, Santa Clara, CA (US)

(72) Inventors: Gilad Baruch, Jerusalemi (IL); Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/925,057

(22) Filed: Oct. 28, 2015

(65) Prior Publication Data
US 2017/0124717 A1 May 4, 2017

(51) Int. Cl.
*G06K 9/00* (2006.01)
*G06T 7/00* (2017.01)
*G06T 7/40* (2017.01)

(52) U.S. Cl.
CPC .......... *G06T 7/0081* (2013.01); *G06T 7/0051* (2013.01); *G06T 7/0085* (2013.01); *G06T 7/408* (2013.01); *G06T 2207/10024* (2013.01); *G06T 2207/20144* (2013.01); *G06T 2207/20148* (2013.01)

(58) Field of Classification Search
CPC ... G06T 7/0079; G06T 7/0081; G06T 7/0093; G06T 7/0083; G06T 9/00; G06T 7/0085; H04N 19/597; H04N 19/115; H04N 19/136; H04N 19/17; H04N 19/167
See application file for complete search history.

(56) References Cited

U.S. PATENT DOCUMENTS

| | | | | |
|---|---|---|---|---|
| 6,847,728 B2* | 1/2005 | Tao | ........................ | G06T 7/0071 382/106 |
| 6,999,618 B2* | 2/2006 | Ohta | ...................... | G06T 7/0022 382/171 |
| 7,085,409 B2* | 8/2006 | Sawhney | .............. | G06T 7/0022 345/419 |
| 7,274,800 B2* | 9/2007 | Nefian | ............... | G06K 9/00335 348/169 |

(Continued)

OTHER PUBLICATIONS

"Active Contour Model," https://en.wikipedia.org/wiki/Active_contour_model, creation Jul. 31, 2007 with revisions therafter, 10 pages.

(Continued)

*Primary Examiner* — Amir Alavi
(74) *Attorney, Agent, or Firm* — Green, Howard & Mughal, LLP

(57) ABSTRACT

Techniques for a system, article, and method of background-foreground segmentation for image processing may include obtaining pixel data including both non-depth data and depth data for at least one image, where the non-depth data includes color data or luminance data or both and associated with the pixels; determining whether a portion of the image is part of a background or foreground of the image based on the depth data and without using the non-depth data; and determining whether a border area between the background and foreground formed by using the depth data are part of the background or foreground depending on the non-depth data without using the depth data.

25 Claims, 9 Drawing Sheets

(56) References Cited

OTHER PUBLICATIONS

Comaniciu et al., "Mean Shift: A Robust Approach Toward Feature Space Analysis," IEEE Transactions on Pattern Analysis and Machine Intelligence, vol. 24, No. 5, May 2002, 17 pages.
Forsyth, D.A., "Segmenting Images and Mean Shift," last modified Oct. 11, 2011, 39 pages.
Hickson et al., "Efficient Hierarchical Graph-Based Segmentation of RGBD Videos," 26th IEEE Conference on Computer Vision and Pattern Recognition, Columbus, OH, USA, Jun. 2014, Georgia Institute of Technology, Atlanta, GA, USA , 2Microsoft Robotics, Seattle, WA, USA, http://www.cc.gatech.edu/cpl/projects/4dseg, 8 pages.
Mille, Julien, "Narrow band region-based active contours and surfaces for 2D and 3D segmentation," Preprint submitted to Computer Vision and Image Understanding May 18, 2009, 25 pages.
Rother et al., "Grab Cut," Image and Video Editing, Microsoft Research Cambridge, http://research.microsoft.com/en-us/um/cambridge/projects/visionimagevideoediting/segmentation/grabcut.htm, 2 pages.
Sallem et al., "Extended Grab Cut for 3D and RGB-D Point Clouds," J. Blanc-Talon et al. (Eds.): ACIVS 2013, LNCS 8192, 12 pages.
U.S. Appl. No. 14/866,686, filed Sep. 25, 2015, entitled "Histogram-based mean shift segmentation", not yet published.

* cited by examiner

FIG. 1

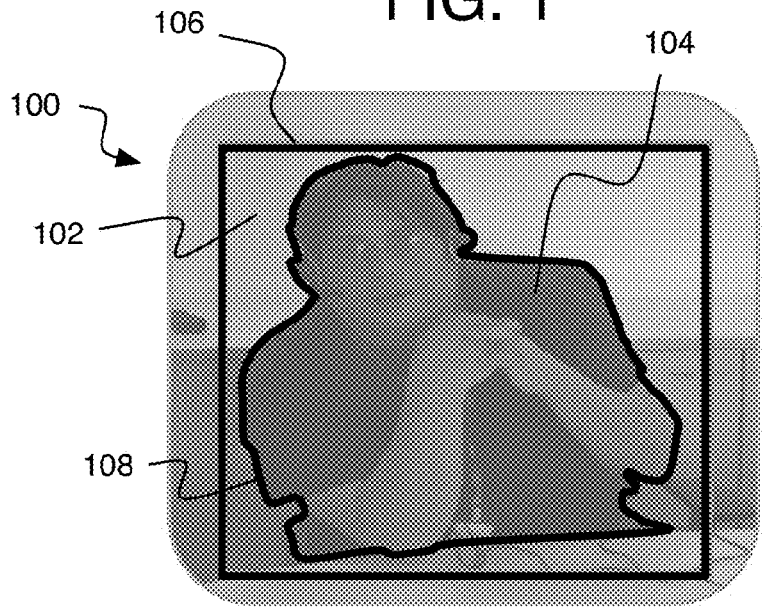

| OBTAIN PIXEL DATA COMPRISING BOTH NON-DEPTH DATA AND DEPTH DATA FOR AT LEAST ONE IMAGE, WHEREIN THE NON-DEPTH DATA COMPRISES COLOR DATA OR LUMINANCE DATA OR BOTH AND ASSOCIATED WITH THE PIXELS 202 |

↓

| DETERMINE WHETHER A PORTION OF THE IMAGE IS PART OF A BACKGROUND OR FOREGROUND BASED ON THE DEPTH DATA WITHOUT USING THE NON-DEPTH DATA 204 |

↓

| DETERMINE WHETHER A BORDER AREA BETWEEN THE BACKGROUND AND FOREGROUND FORMED BY USING THE DEPTH DATA ARE PART OF THE BACKGROUND OR FOREGROUND DEPENDING ON THE NON-DEPTH DATA WITHOUT USING THE DEPTH DATA 206 |

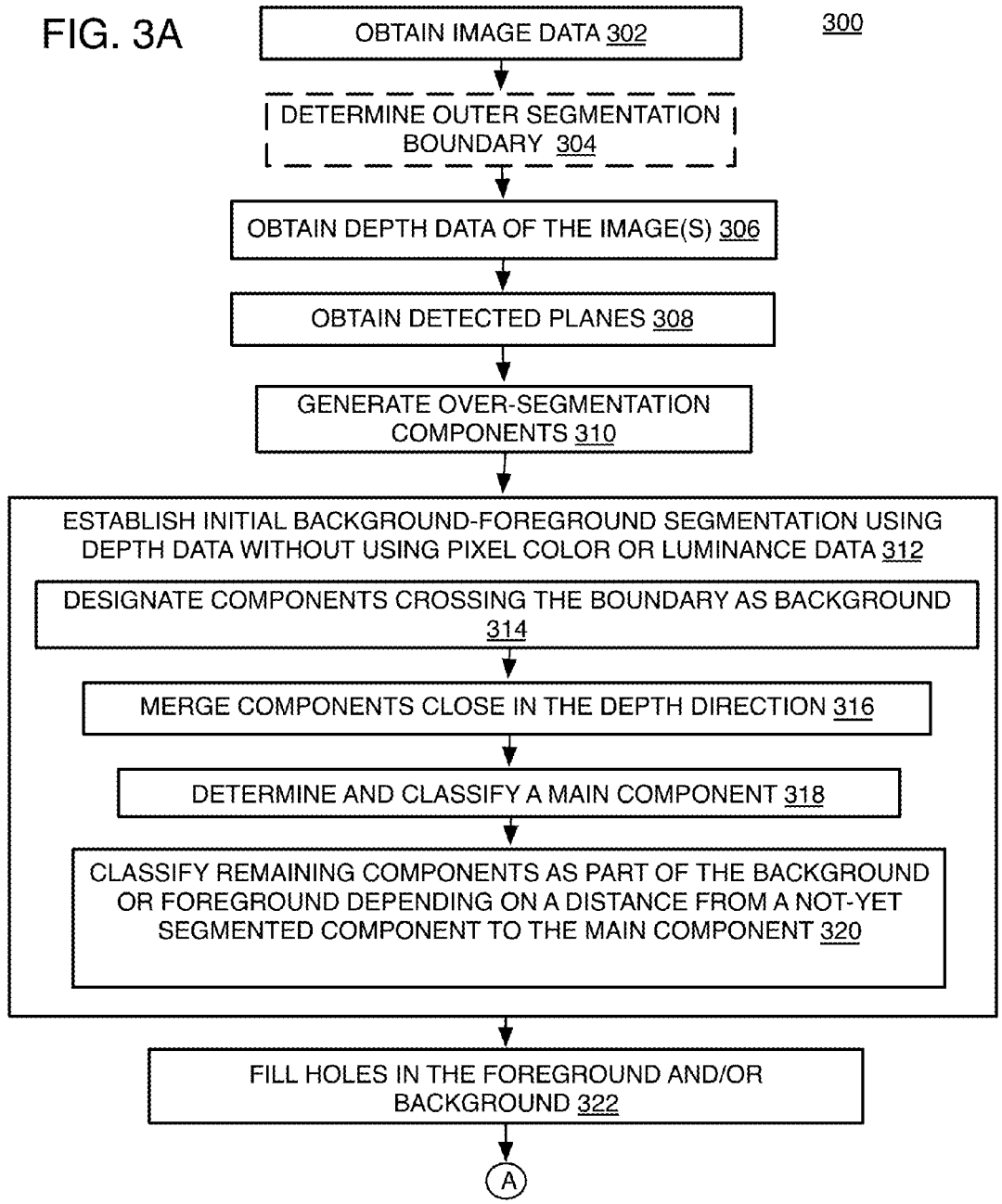

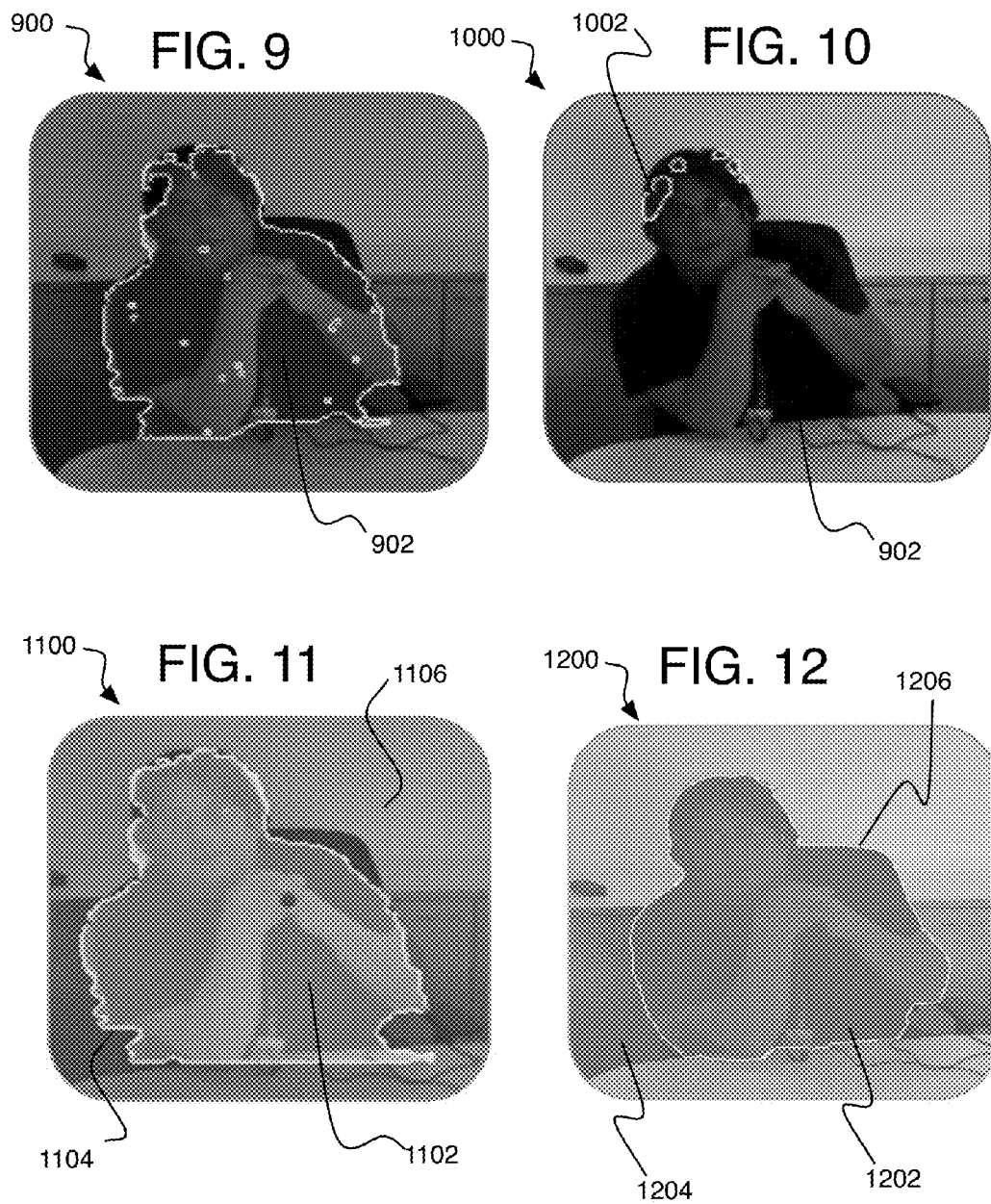

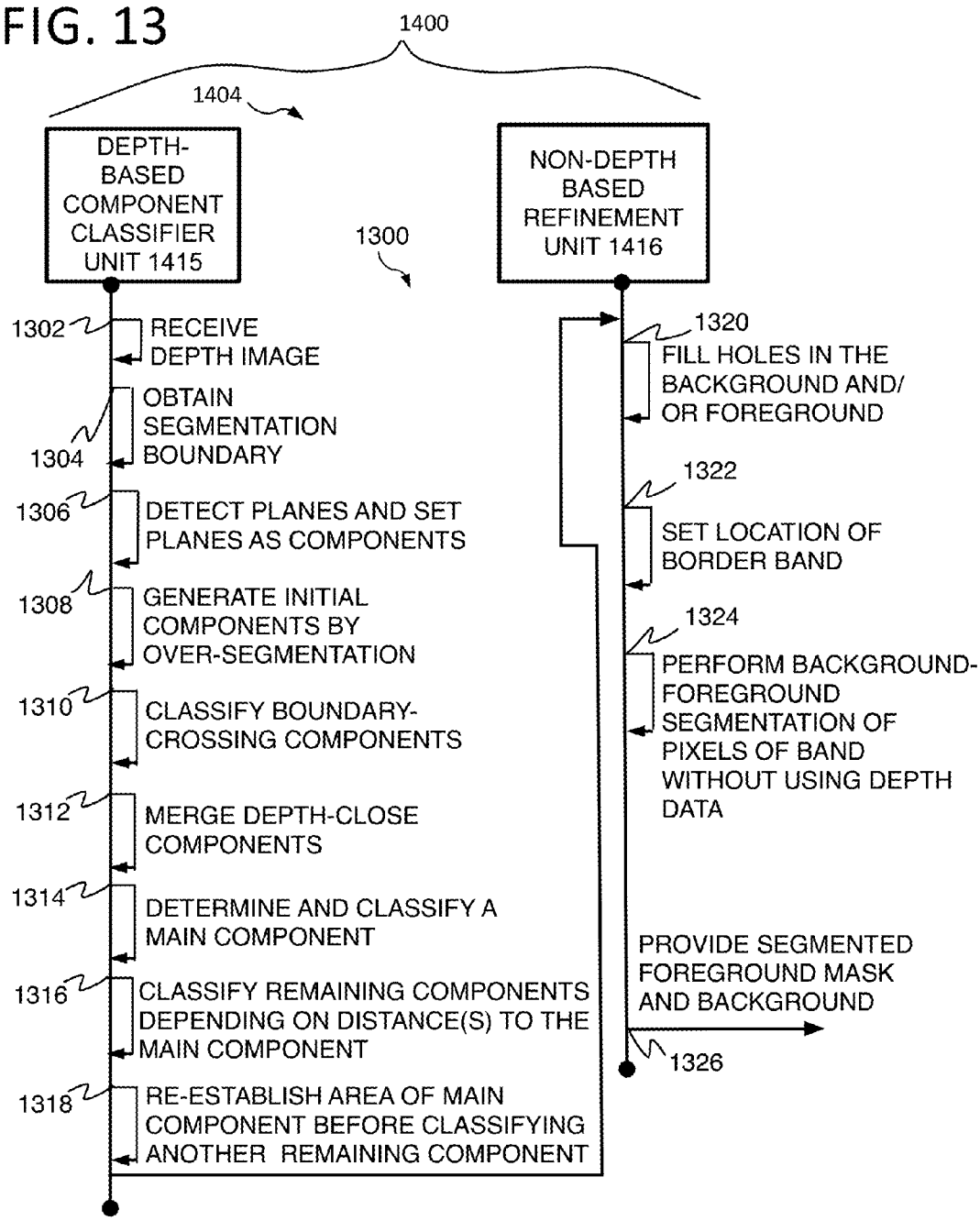

METHOD AND SYSTEM OF BACKGROUND-FOREGROUND SEGMENTATION FOR IMAGE PROCESSING

BACKGROUND

When an image or scene is captured on a camera or provided on some other electronic device or computer as a digital image, it can be desirable to modify the image in ways that require the device to first segment the foreground of the image from the background. For example, a user may want to change the background in the image for entertainment reasons, practical reasons such as to replace the background of a person speaking in a video conference to provide a background more appropriate or less distracting for business purposes, or artistic reasons. The background-foreground segmentation also may be used for computer vision, object recognition, medical imaging, video coding efficiency, and others.

One conventional way to segment the foreground from the background in an image is to only use the color data of the pixels in the image. These methods, however, are often very computationally heavy and time consuming since they are performed on a pixel by pixel basis with very large resolutions throughout an entire area on the image to be separated into background and foreground. The color-based segmentation can also be inaccurate when the background and foreground have the same colors or when a color pattern has strong color differences that are mistakenly and undesirably split into different segments.

Other conventional background-foreground segmentation systems use depth data provided by a camera to take advantage of the depth resolution that is smaller than the color resolution. Specifically, many image capture devices also have 3D or depth sensing cameras (such as a RGBD cameras) that can form a 3D space of a scene. This is typically performed by using multiple cameras and triangulation algorithms or other known methods to generate a depth image from a single camera. The depth image or depth map has a much smaller resolution compared to the pixel's color data. The conventional background-foreground segmentation uses a weighted combination of the color and depth data of the pixels to determine whether the pixels are part of the background or the foreground. This combination, however, can be found to be inconsistent and inaccurate since it is an artificial combination where a clear relationship between color and depth does not necessarily exist.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is an illustration of an image to be segmented into background and foreground as shown;

FIG. 2 is a flow chart showing a method of background-foreground segmentation for image processing in accordance with the implementations herein;

FIGS. 3A-3B is a detailed flow chart of a method of background-foreground segmentation for image processing in accordance with the implementations herein;

FIGS. 5 TO 12 each illustrate an image to explain an operation in the method of background-foreground segmentation for image processing in accordance with the implementations herein;

FIG. 13 is a diagram of the background-foreground segmentation method in operation of an example system described herein;

DETAILED DESCRIPTION

Figure 3B:
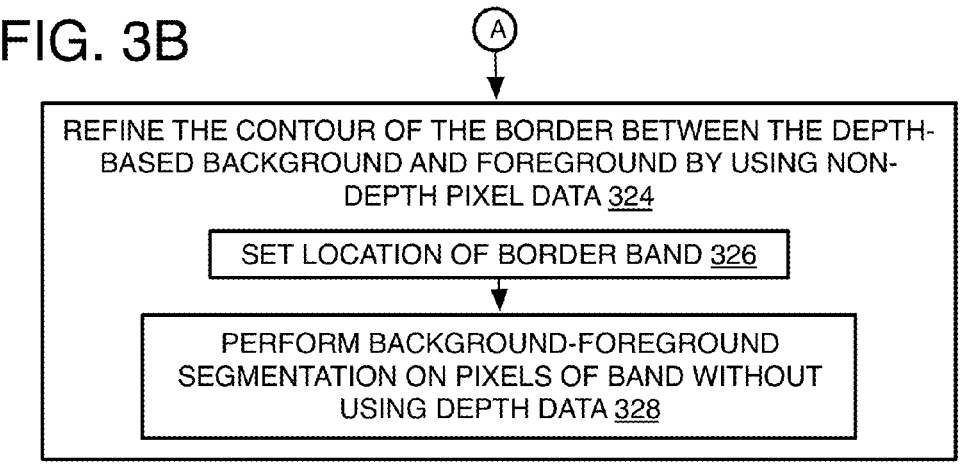

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide background-foreground segmentation for imaging processing.

As mentioned above, it can be desirable to segment the foreground of an image from the background whether for entertainment, practical reasons such as to replace the background of a person speaking in a video conference to provide a background more appropriate or less distracting for business purposes, or for artistic reasons. The background-foreground segmentation also may be used for computer vision, object recognition, medical imaging, video coding efficiency, and others.

Also as mentioned, many different algorithms exist to perform background-foreground segmentation, most of which rely on color data of the pixels in the image. These methods typically operate on the assumption that pixels near each other with the same or similar color are part of the same object in the image, and this is usually determined by analyzing the color distributions or gradients in certain patterns of the pixels. These methods, however, can be inaccurate when areas of the image that should be placed in different segments are erroneously placed in the same segment because the areas have the same color, or when an alternating color pattern should be placed in a single segment but is split into different segments because the pattern has alternating colors of very different colors. Also, the methods are often very computationally heavy and time consuming since they are performed on a pixel-by-pixel basis with very large resolutions throughout an entire area, such as a selected boundary or boundary box (which also may be referred to as a bounding box), on the image to be separated into background and foreground. It should also be noted that the actual area that is segmented may be referred to as the region of interest (ROI) which may or may not be larger than the boundary or smaller than the entire image.

Other conventional background-foreground segmentation systems use depth data provided by a camera to take advantage of the smaller resolution of the depth image versus the color data. Specifically, many image capture devices also have 3D or depth sensing cameras (such as a RGBD cameras) that can form a 3D space of a scene. This can be accomplished by using a stereoscopic system with an array of cameras or sensors on a single device, such as a smartphone or tablet, and that uses triangulation algorithms to determine 3D space coordinates for points in a scene to form a depth map or depth image for the scene. Other methods to generate a depth image from a single camera also are known.

Approaches for RGBD-based segmentation typically tend to extend color only algorithms by adding an additional channel for depth data. For instance, the conventional background-foreground segmentation uses a weighted combination of the color and depth data of the pixels to determine whether the pixels are part of the background or the foreground. See for example, Blanc-Talon et al., *Extended GrabCut for 3D and RGB-D Point Clouds*, Proceedings at Advanced Concepts for Intelligent Vision Systems, 15th International Conference (2013), and Hickson et al., *Efficient Hierarchical Graph-Based Segmentation of RGBD Videos*, Proceedings of IEEE Conference on Computer Vision and Pattern Recognition (CVPR) (2014). These methods describe a graph cut approach that is extended by creating node weights based on both RGB and depth. These methods attempt to "fuse" depth and color information at a low level for an entire area that is to be segmented. Such approaches are sensitive to noise and sparseness inherent in depth data such that fusing these very distinct channels is "artificial" in the sense there is little, if any, mathematical theory that reveals that there is some clear relationship between color and depth and an advantage to fusing the data.

To resolve these issues, the present method is a hybrid approach that uses each information channel (depth and color) in a way that separately takes advantage of the beneficial characteristics of each of the channels. Specifically, the depth channel is used to perform 3D analysis of the scene in an image in order to generate a coarse determination of whether areas on the image are part of the foreground (foreground mask) or background of the image. This is performed without using the color data of the image and is performed at a relatively lower quality, typical depth map resolution of 480×360 by one example. Then, the color channel is used to refine the foreground mask by using the higher quality RGB channel (with a resolution of 1920× 1080 or higher for example) and, by one form, without using the depth data. Once the depth data is used to determine a general border between coarse background and foreground segments, there is no longer any need for high accuracy depth determinations within the interior of the segments. The border between the segments, however, still may be too coarse for definite and accurate segmentation. Thus, the higher accuracy, high-resolution color-based segmentation is reserved for the segmentation borders.

Referring to FIG. 1 for example, the color channel is used at a border, or band extending along the border, between the coarse foreground mask and background first generated by using the depth data. Particularly, an image 100 is shown where it is desirable to segment a foreground 102 from a background 104 within a selected boundary 106. The present method and system described herein use depth data of the image to provide a coarse border 108 between the foreground 102 and background 104. Thereafter, the contours of the border 108 are refined by applying segmentation operations that use the color data of the pixels in an area at or near the border 108 rather than over the entire boundary 106 as explained in greater detail below, and in one form, without using the depth data. This is explained in greater detail below.

Thus, the refinement algorithms using the color data are applied on significantly less than the entire area to be segmented into background and foreground. Since depth preprocessing is used to generate the coarse background and foreground locations on most of the area to be segmented, refining the result in the color domain on a relatively small band at the border of the segmentation for example is much easier and a more robust task compared to that of the "fusion" methods.

Referring to FIG. 2, process 200 is provided for a method and system of background-foreground segmentation for image processing. In the illustrated implementation, process 200 may include one or more operations, functions or actions 202 to 206 numbered evenly. By way of non-limiting example, process 200 may be described herein with reference to example image capture processing system 1300 of FIG. 13, and where relevant.

Process 200 may include "obtain pixel data comprising non-depth data and depth data for at least one image, wherein the non-depth data comprises color data or luminance data or both and associated with the pixels" 202. As explained below, this may include obtaining raw data of pixels and in a color space (such as RGB, YUV, and so forth), and pre-processing raw image data sufficient for generating a 3D space. 3D processing may be applied and may include rectification, feature matching, and final depth calculations to generate a depth map or the depth image. The depth image represents a 3D space that may have been formed from multiple images of the same scene whether from one camera or multiple cameras, and whether taken at the same time instant or different times (typically when the scene does not move). The result is a depth image where the content of each pixel has three dimensional (x, y, z) coordinates.

The process 200 also may include "determine whether a portion of the image is part of a background or foreground of the image based on the depth data and without using the non-depth data" 204. This operation may include using the depth data to generate clusters or initial components of multiple pixels and with a certain depth value (as measured from the camera or camera sensor for example) for each component to provide an over-segmentation of the image. By one form, planar detection also may be used to group pixels so that each plane is used as a single component which limits the chances that areas of the image that are located on the same plane are placed in different segments when those areas should form a part of the same segment. This is particularly true for those planes that extend perpendicular to the camera view point (or optical axis). Also, using a plane as a single component reduces the computational load for the over-segmentation. Then, the components that extend outside of a boundary or boundary box by a threshold amount may be classified as background. The remaining components within the boundary that are close in depth value to each other may be merged right away. Thereafter, the largest component is classified as foreground and designated the main component. When there are a number of large components roughly the same or similar size, the closest of the large components to the camera (the large component with the least depth) is declared to be the foreground. By an alternative, the largest component within a certain percentage of components with the smallest depths may be classified as the main component or first foreground component. The remaining components are then identified as part of the foreground mask or part of the background depending on the distances from the individual remaining components to the to the main component, and by one form, the 3D distance using the 3D coordinates associated with individual pixels or depth map blocks of pixels. By one example, this is measured between a closest edge of a component to be classified and the closest edge of the main component that is already classified as foreground or background. Many details are provided below. The addition of the remaining components is performed iteratively by recalculating the main component's area and distances to the remaining components after each time a component is added to the main component.

Process 200 then may include "determine whether a border area between the background and foreground formed by using the depth data are part of the background or foreground depending on the non-depth data without using the depth data" 206. This operation may include determining a band extending along the border between the background and foreground established by the depth data so that the color data (and/or luminance data) based segmentation can be applied within or at the band rather than the entire area to be segmented. By one example, the band is about 10 pixels wide. The color-data based segmentation operations may include the use of color-based techniques described below.

Referring to FIGS. 3A-3B, a process 300 is provided for a method and system of background-foreground segmentation for image processing. In the illustrated implementation, process 300 may include one or more operations, functions or actions 302 to 328 numbered evenly. By way of non-limiting example, process 300 may be described herein with reference to example image processing system 1300 of FIG. 13, and where relevant.

Process 300 may include "obtain image data" 302. This operation may include obtaining pre-processed raw image data with RGB, YUV, or other color space values in addition to luminance values for at least one image such as with still photographs or a series of images such as with a video sequence. The color and luminance values may be provided in many different additional forms such as gradients, and so forth. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

Referring to FIG. 1, the process 300 then may include "determine outer segmentation boundary" 304. This may include obtaining the location of at least one boundary or boundary box on an image, such as boundary 106 on image 100, which establishes the area of the image to be segmented. The boundary 106 may be established manually by a user or automatically. For example, a user may place the boundary on the image by writing it on a touch sensitive screen or otherwise by manipulating a cursor or by other devices with a display screen. By another form, a system may automatically set the boundary for segmentation such as for applications with a certain purpose such as a face detection application, and so forth. By yet other forms, the boundary may be omitted altogether especially for automatic processes that perform the segmentation for computer vision or video coding efficiency and so forth that will segment the entire image.

By some examples, the system performing the processes herein may use settings based on the assumption that the outer boundary (or a bounding box) will be set so that the largest object in the boundary is to be part of the foreground mask (the terms foreground and foreground mask may be used interchangeably herein). This is typical when attempting to use a person or group of people as the foreground, or an image of a certain single object such as car.

Process 300 may include "obtain depth data of the image(s)" 306. Also, as mentioned herein, depth image data may be determined by a stereo camera system that captures images of the same scene from multiple angles. The system may perform an initial rectification operation on the multiple images before the features in the different images are then matched. Triangulation algorithms, or other equivalents, may be used to determine a 3D space for the scene in the image and the depth dimension for each point, pixel, or feature in the image. Otherwise, other ways to determine three dimensions from a single camera are possible such as time-of-flight, and structural or coded light technologies. A table or depth map of depth values for each pixel value (or in other words, the formation of 3D (x, y, z) coordinates) for the content at each pixel or for a block or other group of pixels (determined by upsampling algorithms for example) forms the depth image data.

Figure 5:

Referring to FIG. 5, process 300 may include "obtain detected planes" 308. This operation is performed to reduce the computational load of segmentation by efficiently grouping pixels located on the same plane, which often indicates a real world planar surface such as a table top, wall, and so forth. Each plane can be treated as a separate component, and each component can then be classified as a unit as background or foreground as with other components found in the image as described below. As mentioned, this attempts to avoid the errors that occur when a segmentation system places areas on the same plane to different segments. This operation may be performed by known planar detection methods such as Hough Transform, Random Sample Consensus (RANSAC), or others that may include an iterative test to determine parameters and/or points that satisfy an algebraic planar equation within some sort of error range to compensate for noise. Other techniques may use a normal comparison method that iteratively merges small adjacent patches which have similar normals. In this case, such a technique establishes a plane when a group of patches with similar normals are larger than some threshold. The planar results also may be revised by known hole filling techniques. These planar detecting techniques result in an index map including a list of planes and list of supporting pixels for each plane. In the present example, image 500 shows that table top plane 502 was detected and the plane will be treated as a separate component for segmentation. Each plane that is detected may be treated as a separate component when multiple planes are detected.

The process 300 may include "generate over-segmentation components" 310, and particularly to divide the image, and in one form, the entire image, into initial components. By other forms, it may be sufficient to over-segment just an extended region such as a region of interest (ROI) a bit larger than the boundary and that has an area formed from using about 130% of the width and the height of the boundary. This may be performed for performance considerations.

Thus, the image depth data, except for the areas of the planar components when provided, are used in algorithms that group pixels into clusters or components by finding some common characteristic for the pixels. By one example, a mean-shift algorithm is formed that replaces the depth value of individual pixels with the depth value mean of the pixels in a range-r neighborhood (or cluster) and is included in the cluster, in part and generally, depending on whether the pixel with a certain depth value is within a certain distance (or window) from the location of the mean value within a range of depth values. Thus, the mean-shift algorithm may involve using a distance function for measuring the distances between depth values at the pixels where all pixels within the radius (measured according to the distance) will be accounted for in the cluster to establish a depth value difference (based on pixel data) so that only those pixels that have data within this depth value difference are used for calculating the mean. The algorithm, however, is applied iteratively by shifting the bins (windows) to have the new calculated mean in the center. Now all the pixels are reassigned to clusters and new means are calculated. This process continues until the computed mean and the new calculated means are the same, so the bin stays in place. (It does not have to be precisely equal, a small epsilon difference of say 0.1 is enough). By one example, histogram-based mean-shift segmentation may be used and with bins of width 1 over the depth data (without using non-depth data such as color or luminance) and which may be set from 0 to 1000 cm (10 meters), and 12 intervals were found to be sufficient. The windows are located with no overlap, while filling all the histogram values (so window width is 1000 cm/12). One such mean-shift methodology is provided by Comaniciu et al., *Mean Shift: A Robust Approach Toward Feature Space Analysis*, IEEE Transactions on Pattern Analysis and Machine Intelligence, Vol. 24, No. 5, May 2002. Another example mean-shift technique is provided by U.S. patent application Ser. No. 14/866,686, filed Sep. 25, 2015, and published as U.S. Patent Publication No. 2017-0091947, on Mar. 30, 2017, and issued as U.S. Pat. No. 9,665,943, on May 30, 2017, and which is incorporated herein in its entirety.

Figure 6:
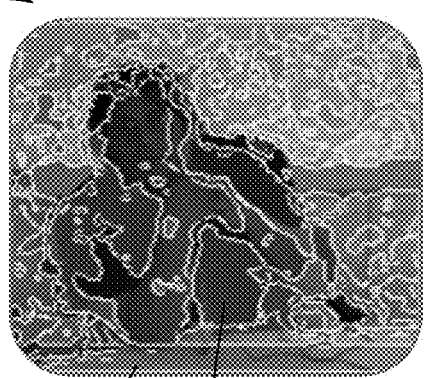

Referring to FIG. 6, the result of such a mean-shift operation is shown on image 600 where image 600 shows numerous initial components 602 substantially filling the image 600 in this example and including both those components 604 determined from mean-shift (or other clustering) techniques, and those initial components determined from planar detection such as plane component 502. Each initial component is associated with a group of pixels that form the component and a mean depth of the component. Some of the initial components will form the foreground and other initial components will form the background. By other alternatives, instead of a mean depth value, different values such as a median, weighted average, or the entire range may be used.

Process 300 is then ready to proceed to "establish initial background-foreground segmentation using depth data and without using pixel color or luminance data" 312. As mentioned, this may increase accuracy because it avoids color-based segmentation that may err when areas of an image that should be placed in different segments are placed in the same segment because the areas have the same color, or when a color pattern that should be placed in a single segment is placed in multiple segments instead because the pattern has alternating colors of very different colors. Also, color-based segmentation may substantially reduce the computational load (and may reduce the time for computations) since the depth map may have a resolution significantly smaller than the color space or luminance resolution, and may be more accurate since depth is the main factor for determining foreground from background and is therefore a more direct factor than color or luminance.

Figure 7:
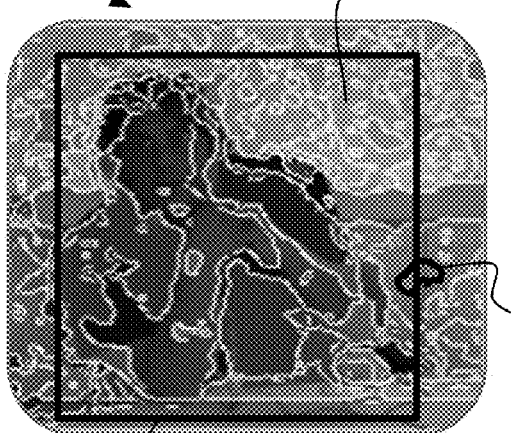

Referring to FIG. 7, the process 300 may include "designate components crossing the boundary as background" 314. This operation includes overlaying the outer boundary (or bounding box) 106 on the initial components 602 of the over-segmentation, and as shown on image 700. Those initial components 702 that cross the boundary 106 are designated as background, and by one form, when a certain portion of the initial component 702 is outside of the boundary 106. For example, this may be when a majority of the area (or number of pixels) in the initial component are outside of the boundary. By another example, it may be that an initial component is considered part of the background when about 10% of the initial component (measured by its pixel area) is outside of the boundary 106. By yet another example, this determination may depend on a combination of the area outside the boundary (or bounding box) and the maximum distance between the component and the boundary such that when the component extends outwardly from the boundary by a distance that is less than a threshold, such as by a mere pixel or two, the component may still be considered as part of the foreground or at least further segmentation analysis rather than automatically being considered part of the background at this point. This may be true even though a relatively large pixel area is positioned outside of the boundary. It will be understood that this operation also may include setting the components that are entirely outside of the boundary as part of the background as well.

Figure 8:
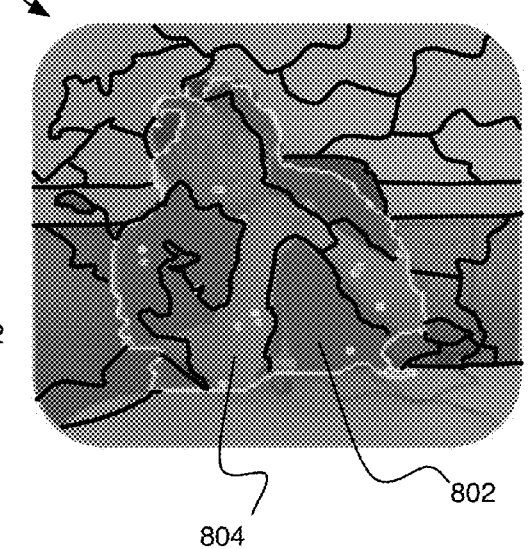

Referring to FIG. 8, in order to further reduce the number of the initial components from the over-segmentation, process 300 may include "merge components close in the depth direction" 316. Particularly, those initial components 602 that have a mean depth value (as determined from the over-segmentation operation) within a certain maximum distance and are adjacent to each other are joined into a single merged component 802. Image 800 shows example merged components 802 simplified for exemplary purposes and may not reflect a realistic merging of the initial components 602 of image 600. By other examples, merged components could be established by depth similarity only, and regardless of whether the initial components are adjacent to each other so that a single component could form a scattered area around the image. By another option, the components should be within a certain distance from each other (such as 5 pixels) to be considered part of the same merged component. By one form, the maximum depth for merging is set by experimentation, and by one example is set at about 5 cm uniformly. Otherwise, different depth differences could be used for different depths (or depth intervals). For example, components with a small depth (close to the camera) may be merged if the distance is less than 5 cm apart, but components which are over 5 meters (from the camera) may use a threshold of 20 cm apart. This may be performed to compensate for noise in the depth values that may be greater with greater depth.

The process 300 then may include "determine and classify a main component" 318. Particularly, a main or first component is determined for the foreground or background. The present example proceeds with determining the main component as a first or main component of the foreground. Thus, the first component is the basis for the foreground mask.

The first foreground component is selected among the merged components by first selecting the component by its size or depth relative to the other components or both. For one example, it may be assumed that the largest component of the boundary (or bounding box) is a foreground component. Thus, it is assumed that in most cases a user manually, or computer operating automatically, will select an object in the image and place the segmentation boundary around the object so the object is the largest part of the image within the boundary. For segmentation that does not use a boundary (or bounding box), the largest component in the image (or largest object detected if such detection is performed) may be assumed to be the first or main component of the foreground mask.

When a number of large components similar in size exist within (or extend in) the boundary, the system may select the large component with the smallest depth (or closest to the camera) as the main or first component. Similar here may refer to components that all have an area that is at least 20% of the area of the boundary (or bounding box). Otherwise, the components might be compared to each other and set so that similarity refers to an area that varies component-to-component by some percentage determined by experimentation and counted in pixels By another example, the largest component that also has a relatively small depth relative to the other components in the image is set as the main or first foreground component. Stated another way, the largest component among the components with the smallest depths (say within the smallest 20% (or other portion determined by experimentation) of all of the depths provided by the components in the image) is set as the first foreground component.

A test is then performed to determine whether the other components in the image are within a maximum threshold distance from the main component, and if so, to add the other component to the first (or main) foreground component or foreground mask. The foreground was chosen as the main component rather than the background to add components to the foreground in order to cover the circumstances when the other component would be subjectively considered as part of the foreground by a user observing the image even though that other component may be closer to a background component than the foreground component (such as an object on a background table for example). It will be appreciated, however, that the main or first component could be in the background instead. For the present example, merged component 804 (FIG. 8) will be deemed the main or first component of the foreground mask.

Referring to FIG. 9, the process 300 may include "classify remaining components as part of the background or foreground depending on a distance from a not-yet segmented component to the main component" 320. As mentioned, this operation determines whether the other (or remaining) components are within a certain maximum distance to the main component, and if so, add the other component to the main component thereby classifying the other component the same as the main component. This may be performed in a number of different ways.

Figure 4:
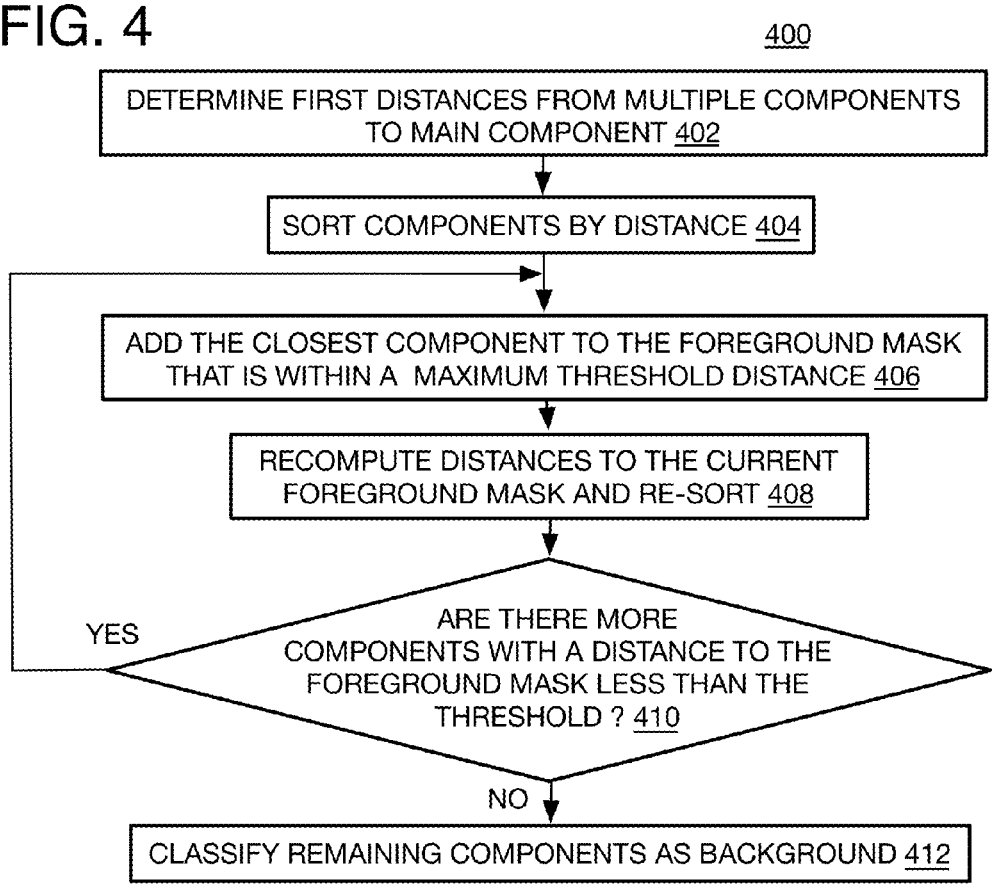
FIG. 4 is a flow chart of a portion of the background-foreground segmentation method of FIGS. 3A-3B.

Referring to FIG. 4, a process 400 discloses one alternative way to perform operation 320 to identify the remaining components as background or foreground. Process 400 includes operations 402 to 412 numbered evenly.

Process 400 may include "determine first distances from multiple components to the main component" 402, and in the present example, where the main component is a first foreground component. By one example, this is determined by measuring the 3D (x, y, z) Euclidean distance from the closest point on an edge of the first foreground component and to each remaining (or other) component yet to be classified. Thus, this operation factors both the closeness in depth as well as in the closeness in the 2D (x, y) direction between the components. The distances are calculated for individual remaining components, and by one example, all other components until each remaining component has a distance to the first foreground component. By another form, a geodesic distance can be used instead of the Euclidian when considering components which are not adjacent to the main component.

Process 400 may include "sort components by distance" 404. Thus, a list of components may be formed and sorted in order by distance so that the remaining component closest to the first foreground component is identified.

Process 400 may include "add the closest component to the foreground mask that is within a maximum threshold distance" 406. Thus, the closest component to the foreground (at the top of the sorted list by one example) is classified as foreground when the distance from that closest component to the first foreground component is less than the threshold. By one example, the threshold may be about 5 cm. This threshold may be determined by experimentation by considering the range of distances within the image and a typical depth distance in the expected object. For example, if it is known that a person standing in front of a camera are to be segmented form the scene behind them, the system assumes that there is not a large difference in the depth of the foreground object, and this can be determined by prior measurement. In this example, the distances may be based on the typical measurement of the anterior-posterior (front to back) direction of a person, or a measurement of the distance from the tip of the nose to the neck, and so forth to understand what might be the maximum difference. This distance or threshold can also be different for different depth intervals (close depths versus far depths for example). Other limitations may come from the cameras depth measurement limitations, and so forth.

This operation also includes adding the area (or pixels) of the newly classified component to the first foreground component (or foreground mask) which increases the area of the first foreground (or main) component, and changes the position of the outer border of the first foreground component on the side of the main component that the closest component was added to. This may change the distances between the first foreground component and the remaining unclassified components.

Thus, process 400 may include "re-compute distances to the current foreground mask and re-sort" 408, thereby forming an iterative process where each time a component is added to the main component (or foreground mask in the present case), the distances to the remaining components are recalculated to find the next unclassified component that is the closest to the foreground mask, and by one form, within a maximum threshold distance. Thus, each remaining component may or may not receive a different distance after a previous component is added to the foreground mask depending on whether the outer border of the foreground mask closest to the remaining compound changed by the adding of the previous component added to the foreground mask.

Process 400 then may include a test "are there more components with a distance to the foreground mask less than the threshold" 410. If so, the process repeats to operation 406 to add the next closest remaining component to the foreground mask, and after each component is added to the mask. This is repeated until no component is within the threshold distance to the foreground mask. When this occurs, process 400 may include "classify remaining components as background" 412.

As mentioned, the components could first be classified by a distance to a background component instead. By yet other alternatives, the distance to both a first background component and first foreground component could be compared to classify the component toward the segment with the shortest distance or other variation. By another form, a modified graph-cut based approach may be used where a node in the graph does not represent a pixel, but a component instead. In this case, applying a "min-cut max-flow" will separate the components to foreground and background. Many other variations exist.

Referring to FIGS. 10-11, at this point, pure depth domain processing is completed (versus color or luminance domains). The result is a rough foreground mask 1102 on image 1100. As can be seen in the example the mask is noisy with edges not well aligned with color edges. Misalignment may be due to the lower resolution of depth data versus color (480×360 vs 1920×1080 or higher) and/or calibration parameters set for certain conditions by the manufacturer but cause the misalignment when the operational conditions (whether usage, or temperature and pressure conditions, etc.) are different. Other reasons may be typical problems with the use of stereo matching techniques such as occlusions, where near the outer edges of an object, only one camera sees the scene, which may also cause a hole.

Particularly, as shown in FIG. 10, holes 1002 also exist in the foreground mask 902 that may occur due to errors in the depth map values as just mentioned. Other reasons include surfaces which do not reflect infra-red (IR) for IR distance measuring sensors, objects in the image that are too far (such as the sky) or too close to one or more camera sensors, and over-exposure, and so forth.

Accordingly, returning to the process 300, the process may include "fill holes in the foreground and/or background" 322. Algorithms are then applied that attempt to reconstruct regional "holes" in the depth image, using a color based heuristic for example or known methods or smoothing filters such as regional growth methods. In the example of image 1000, missing depth data in the holes 1002, and in one case, on the person's hair is recovered due to color similarity in this region.

Referring to FIG. 11, the process 300 may include "refine the contour of the border between the depth-data-based background and foreground by using non-depth pixel data" 324, and this may be performed in the color domain. To accomplish this, process 300 may include "set location of border band" 326. By one form, the band 1104 is located along the border of the coarse foreground mask 1102 and coarse background 1106, and by one example, the band extends along the entire border between the current foreground mask and background, but could be set shorter (such as at more visibly inaccurate areas). By one example, the band has a uniform width of about 10 pixels. The band may extend half into the background side and half into the foreground side, although variations could be used as well. The band alternatively may have a varying width as well. In other words, it is the contour itself in the form of the band that is the input to the algorithms (such as active contour described below), and a penalty is asserted to any change from the initial set, but while not enforcing a maximum distance limit.

Once the location of the band to be segmented (or re-segmented) is provided, process 300 may include "perform background-foreground segmentation on pixels of band without using depth data" 328. To achieve this, many existing color-based segmentation algorithms could be used to apply to the pixels within the band (without the need to apply it to the entire image and outside of the band). There are other segmentation processes that use luminance that could be used as well but are not discussed here.

One such example color-based segmentation algorithm is called an active contour technique that forms a deformable contour (or snake) along the border (or here at the band), which segments the band using boundary discontinuities by minimizing an energy function associated with the contour. This algorithm incorporates color-based and shape-based forces with a resultant contour that aligns with the visual contour in the image. The energy function is an iteratively minimizing equation where internal energy controls the deformations to the shape of the contour (referred to as the snake) while external energy controls fitting of the snake onto the image (or in this case, the border). A number of methods may be used like gradient descent for the implementation. Active contour is used due to its performance as well as accuracy and robustness. A final contour is returned as output to the user. One such active contour technique is provided by Mille, *Parameterized Narrow Band Active Contour*, Université François Rabelais de Tours, Laboratoire Informatique (EA2101) (http://liris.cnrs.fr/Documents/Liris-4476.pdf). For the present method, 100 iterations are performed, with 10 passes at each iteration, and after each iteration, the global properties are updated as the color of the foreground and the background.

Alternatively, other color-based graph cutting segmentation techniques, such as GrabCut, may be applied to the band and provides a convenient way to encode color features as segmentation cues to obtain foreground segmentation from local pixel similarities using modified iterated graph-cuts. The grabcut algorithm uses the "tri-Map" of {Foreground, Background, Unknown} using the band of 10 pixels radius around the rough depth-based segmentation. Inside this band as shown on FIG. 11 is foreground, outside is background, and the band 1104 itself is the unknown. The graph-cutting algorithms estimate the color distribution of the two sides of the band (where the coarse foreground side of the band is considered the initial foreground) using a Gaussian mixture model. This is used to construct a Markov random field over the pixel labels, with an energy function that prefers connected regions having the same label, and running a graph cut based optimization to infer their values. As this estimate is likely to be more accurate than the original, taken from the bounding box, this two-step procedure is repeated until convergence.

Again, these color based segmentations methods are only applied at the defined band or otherwise near the border between the initial depth-based defined background and foreground segmentation border in this example rather than applying these techniques to the entire image or entire image area in the segmentation boundary. This reduces the computational load and time since the color domain may have a much higher resolution than the depth domain, and increases accuracy at the border where it may be desired rather than applying it to the entire segment when coarse segmentation in the interior of the segments is quite sufficient.

Referring to FIG. 12, the results of the segmentation are shown on image 1200 where the border 1206 is now smooth and separates a final foreground mask 1202 from a background 1204.

Referring to FIG. 13, process 1300 illustrates the operation of a sample image processing system 1400 for background-foreground segmentation for image processing in accordance with at least some implementations of the present disclosure. In more detail, in the illustrated form, process 1300 may include one or more operations, functions or actions as illustrated by one or more of actions 1302 to 1326 numbered evenly. By way of non-limiting example, process 1300 will be described herein with reference to FIG. 14. Specifically, system 1400 includes logic units or modules 1404. The logic modules 1404 may include a raw image handling unit 1406, a depth map generator unit 1408, a planar surface detection unit 1410, and a background-foreground segmentation unit 1412. The background-foreground segmentation unit 1412 may have a boundary unit 1413, an over-segmentation unit 1414, a depth-based component classifier unit 1415, and a non-depth-based refinement unit 1416 with a hole unit 1418 and a border unit 1419. The operation of the system may proceed as follows.

Process 1300 may include "receive depth image" 1302, and as described above with processes 200, 300 and 400, where the raw image data has already been pre-processed, and the content of the image analyzed to provide 3D coordinates for each of, or blocks of, the pixel points to form a depth image. It will be understood that when the images are frames in a video sequence for any of the processes mentioned herein may apply to each image formed for each frame or other time period, and when multiple cameras are used, the depth image may be associated with, or representing, a three-dimensional space formed from multiple images of the same scene (which may or may not capture the scene at the same time instance).

Process 1300 may include "obtain segmentation boundary" 1304. Particularly, as explained above, a user may manually place a boundary around an area in an image that is to be segmented or around a foreground to be separated form a background. Otherwise, the boundary may be inserted on the image automatically, or even omitted when the entire image is to be segmented.

Process 1300 may include "detect planes and set planes as components" 1306. Thus, the system may use plane detection algorithms (mentioned above) to determine whether any of the pixels in the image form a plane. Each plane may be considered a component to be segmented.

Process 1300 may include "generate initial components by over-segmentation" 1308. This operation includes using a clustering or other pixel grouping algorithm such as mean-shift algorithms explained above. This may be performed by using the depth data of the image without using the color and luminance data. The result is dividing the image (or the part of the image within the boundary) into initial components that each have a mean depth as described above.

Process 1300 may include "classify boundary-crossing components" 1310. As also described above, when the boundary is provided, those initial components that cross the boundary by a certain portion are classified as background. By one example, those initial components that are at least about 90 percent outside of the boundary (measured by its pixel area for example) are classified as background, although other amounts may be used as described above.

Process 1300 may include "merge depth-close components" 1312. This may include merging initial components that have a difference in depth (or mean depth) that is less than a maximum depth difference threshold as described above. The components may or may not need to be adjacent (or some other 2D (x, y) distance) to each other.

Process 1300 then may include "determine and classify a main component" 1314, and as described in detail above, by taking the largest component or the largest component within a group of large components with the smallest depth, as one example. Other alternatives may include simply using the component with the smallest depth. Other alternatives are contemplated.

Process 1300 may include "classify remaining components depending on distance(s) to the main component" 1316, and also as explained above, by determining the distances from the other components to the main component, and then adding the other component to the main component when the other component is the closest component to the main component (with the shortest distance) and when the distance is within a maximum threshold distance. Also as mentioned above, by one example, the distances are measured from the closest outer edges of the components.

Process 1300 may include "re-establish area of main component before classifying another remaining component" 1318. Thus, an iterative process is established, and once a component is added to the main component or foreground mask, the change to the location of the outer edge of the foreground mask due to the addition of the other component is considered, and the distances to the remaining components is recalculated to determine which other component should be the next component to be added to the main component. This process is repeated after each component is added to the main component until no component has a distance less than the threshold, and any remaining components are classified as background.

The process then turns from the depth domain to the color domain. Thus, process 1300 may include "fill holes in the background and/or foreground" 1320, and as explained above by providing depth values for pixels in the segments that are missing depth values, and that are filled by color-based methods that determine the depth values.

Process 300 then may turn to refining the coarse border between the depth-defined background and foreground segments. To accomplish this, process 300 may include "set location of border band" 1322, and as described above, to set a narrow band of pixels at the coarse border where the color-based segmentation will be applied.

Process 300 may include "perform background-foreground segmentation of pixels of band without using depth data" 1324. As explained above, there are many such color-based segmentation techniques that may be applied to the band. Two such techniques include an active contour technique and a grab-cut technique described above.

Process 300 then may provide 1326 the segmented foreground mask and the background indexes or definitions to other applications for further image processing.

In addition, any one or more of the operations of FIGS. 2, 3A-3B, 4 and 13 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 14:
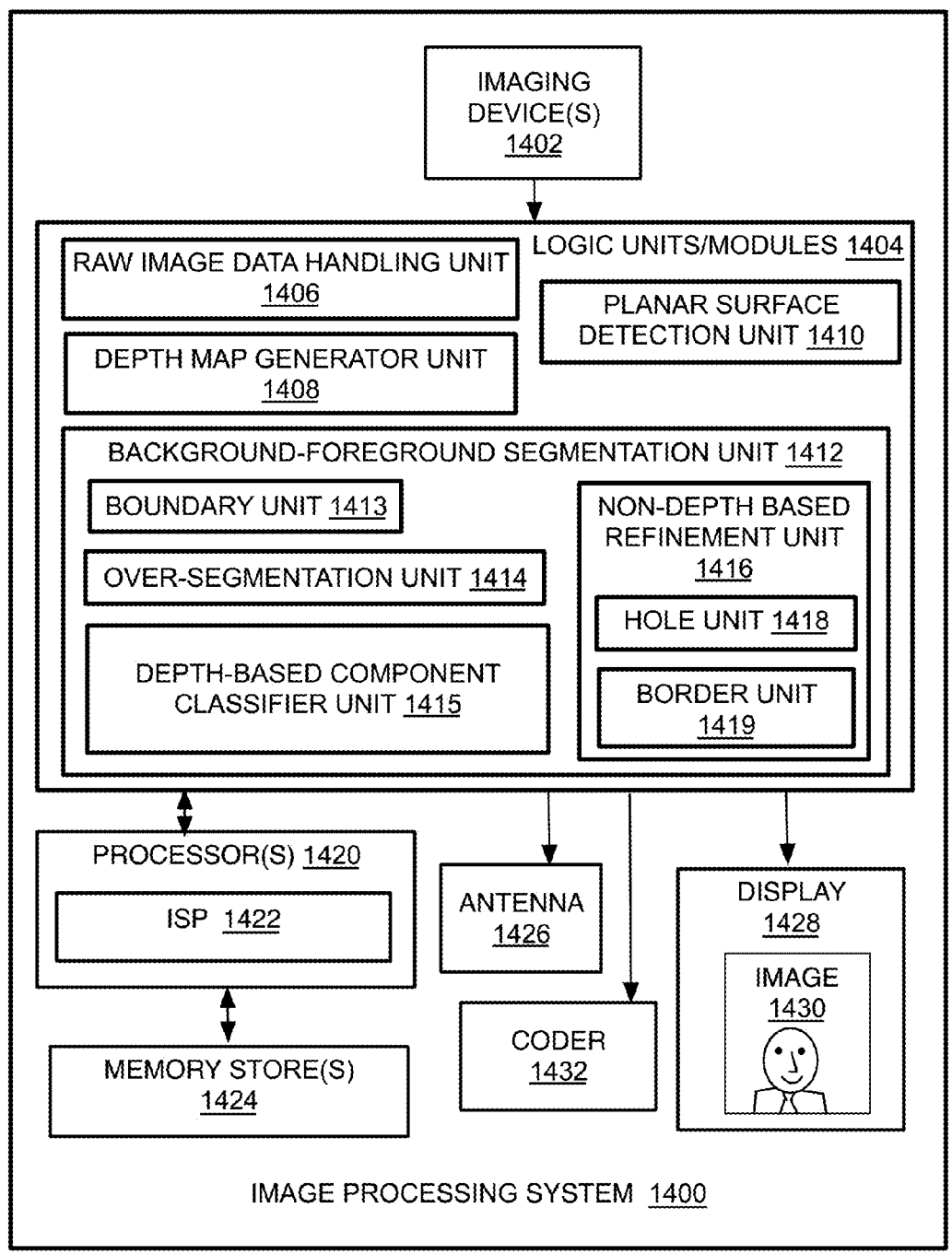
FIG. 14 is an illustrative diagram of an example system.

Referring to FIG. 14, an example image processing system 1400 is arranged in accordance with at least some implementations of the present disclosure. In various implementations, the example image processing system 1400 may have an imaging device 1402 to form or receive captured image data. This can be implemented in various ways. Thus, in one form, the image processing system 1400 may be one or more digital cameras or other image capture devices, and imaging device 1402, in this case, may be the camera hardware and camera sensor software, module, or component. In other examples, imaging processing system 1400 may have an imaging device 1402 that includes or may be one or more cameras, and logic modules 1404 may communicate remotely with, or otherwise may be communicatively coupled to, the imaging device 1402 for further processing of the image data.

Thus, image processing system 1400 may be a single camera alone or on a multi-camera device either of which may be a smartphone, tablet, laptop, or other mobile device. Otherwise, system 1400 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1402 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1402 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1402 may be provided with an eye tracking camera.

In the illustrated example and relevant here, the logic modules 1404 may include a raw image handling unit 1406 that performs pre-processing on the image data sufficient for generating a depth map or depth image, a depth map generation unit 1408 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). The logic modules 1404 also may include a planar surface detection unit 1410 to detect the planar surfaces in the depth image so that the planes can be used as components in the segmentation.

The logic modules also may have a background-foreground segmentation unit 1412 to perform many of the operations already described herein. Thus, for example, the segmentation unit 1412 may have a boundary unit 1413 to set the segmentation boundary, an over-segmentation unit 1414 to establish initial components, and a depth-based component classifier unit 1415 to merge the initial components first into larger merged components, and then into coarse depth-based background and foreground segments. The over-segmentation unit 1414 could be considered as part of the depth-based component classifier unit 1415 instead of a separate unit. A non-depth refinement unit 1416 provides for color-based refinement with a hole unit 1418 to fill holes using color based algorithms and a border unit 1419 to apply color-based segmentation at the coarse segmentation border formed by the depth data. It will be appreciated that the non-depth refinement may include the use of luminance-based algorithms in addition to or instead of the color-based algorithms.

The image processing system 1400 may have one or more processors 1420 which may include a dedicated image signal processor (ISP) 1422 such as the Intel Atom, memory stores 1424, one or more displays 1428 to provide images 1430, a coder 1432, and antenna 1426. In one example implementation, the image processing system 1400 may have the display 1428, at least one processor 1420 communicatively coupled to the display, and at least one memory 1424 communicatively coupled to the processor. A coder 1432, which may be an encoder, decoder, or both, also may be provided. As an encoder 1432, and with antenna 1434, the encoder may be provided to compress image data for transmission to other devices that may display or store the image. It will be understood that as a decoder, the coder may receive and decode image data for processing by the system 1400. Otherwise, the processed image 1430 may be displayed on display 1428 or stored in memory 1424. As illustrated, any of these components may be capable of communication with one another and/or communication with portions of logic modules 1404 and/or imaging device 1402. Thus, processors 1420 may be communicatively coupled to both the image device 1402 and the logic modules 1404 for operating those components. By one approach, although image processing system 1400, as shown in FIG. 14, may include one particular set of blocks or actions associated with particular components or modules, these blocks or actions may be associated with different components or modules than the particular component or module illustrated here.

Figure 15:
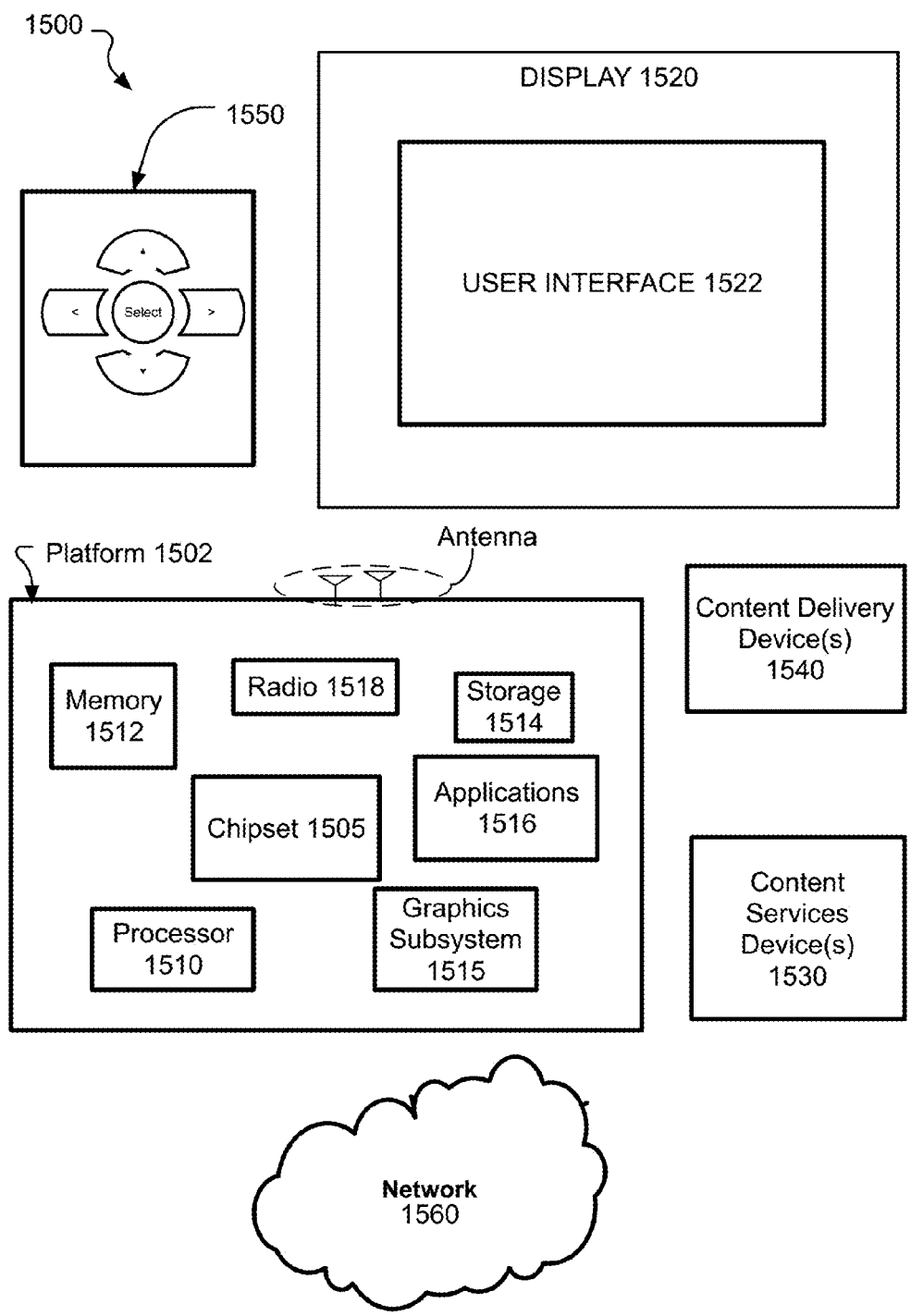
FIG. 15 is an illustrative diagram of another example system.

Referring to FIG. 15, an example system 1500 in accordance with the present disclosure operates one or more aspects of the image processing system described herein. It will be understood from the nature of the system components described below that such components may be associated with, or used to operate, certain part or parts of the image processing system 1000 described above. In various implementations, system 1500 may be a media system although system 1500 is not limited to this context. For example, system 1500 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, Display Port, wireless HDMI, and/or wireless HD compliant techniques. Graphics subsystem 1515 may be integrated into processor 1510 or chipset 1505. In some implementations, graphics subsystem 1515 may be a stand-alone card communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of unidirectionally or bidirectionally communicating content between content providers and platform 1502 and/or display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In implementations, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In implementations, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various implementations, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various implementations, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 15.

Figure 16:
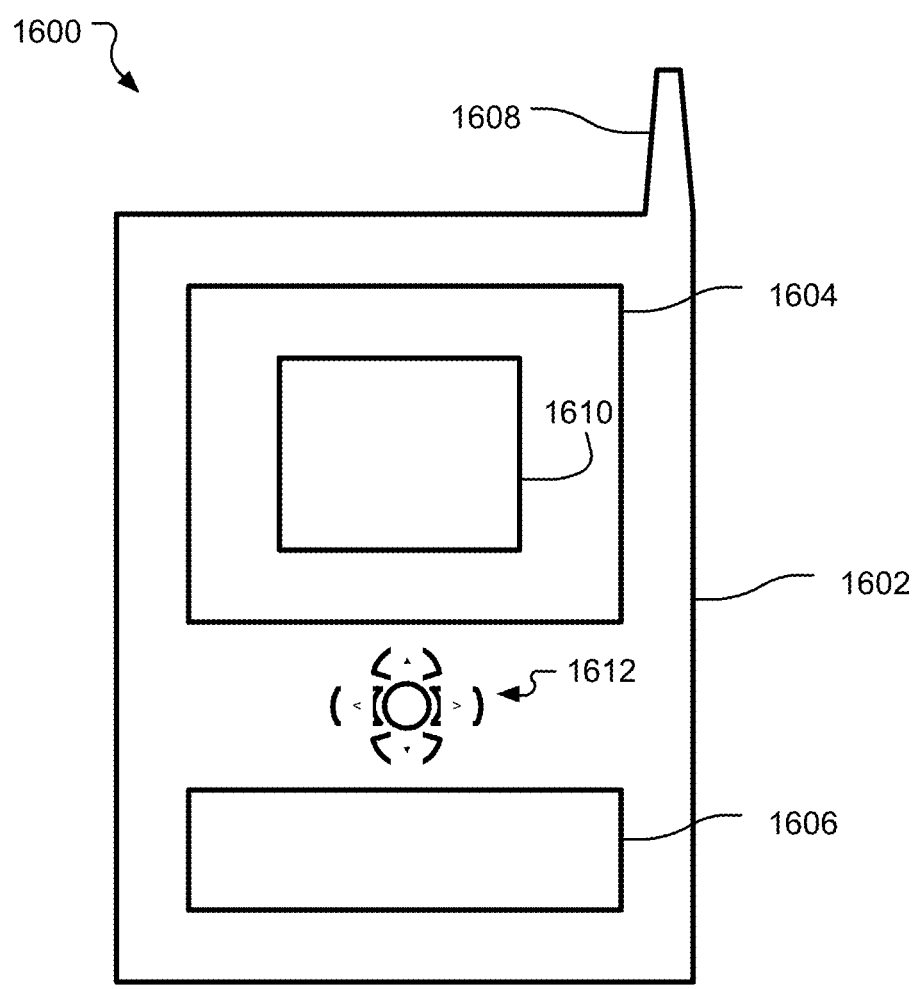
FIG. 16 illustrates another example device, all arranged in accordance with at least some implementations of the present disclosure.

Referring to FIG. 16, a small form factor device 1600 is one example of the varying physical styles or form factors in which system 1400 and/or 1500 may be embodied. By this approach, device 1600 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 16, device 1600 may include a housing 1602, a display 1604 including a screen 1610, an input/output (I/O) device 1606, and an antenna 1608. Device 1600 also may include navigation features 1612. Display 1604 may include any suitable display unit for displaying information appropriate for a mobile computing device. I/O device 1606 may include any suitable I/O device for entering information into a mobile computing device. Examples for I/O device 1606 may include an alphanumeric keyboard, a numeric keypad, a touch pad, input keys, buttons, switches, rocker switches, microphones, speakers, voice recognition device and software, and so forth. Information also may be entered into device 1600 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of background-foreground segmentation for image processing comprises obtaining pixel data comprising both non-depth data and depth data for at least one image, wherein the non-depth data comprises color data or luminance data or both and associated with the pixels; determining whether a portion of the image is part of a background or foreground of the image based on the depth data and without using the non-depth data; and determining whether a border area between the background and foreground formed by using the depth data are part of the background or foreground depending on the non-depth data without using the depth data.

By another implementation, this method may comprise that determining whether at least one component established by detecting a plane in the image is in the background or foreground; performing over-segmentation on the image without using non-depth pixel data, wherein the over-segmentation is performed on areas of the image other than those with components established by detecting planes, and by using a mean-shift algorithm; determining whether at least one component of the image is in the background or foreground depending on whether the component crosses a segmentation boundary established to indicate that segmentation of the image within the boundary is desired; merging components established by over-segmentation based on single depth values established for individual components; designating a first component as part of the foreground or background depending on (1) whether the component is the largest component on the image, or (2) whether the component has a largest or smallest depth relative to other individual components, or (3) both, wherein the first component is a first foreground component, and when a group of large components of similar size exists on the image, the large component with the smallest depth relative to the depth of the other large components is the first component; and determining whether other components are classified as background or foreground based, as least in part, on individual distances from the other components to the first component.

The method also may include wherein the area of the closest other component of the remaining other components is added to the first component and classified as part of the background or foreground when the distance is below a maximum threshold distance; wherein the distance is a 3D Euclidean distance; wherein the distance is measured from closest edge of the other component to closest edge of the first component; wherein the area of the first component is re-established after the area of each component is added to the first component before determining the distances to the remaining other separate components; and wherein the remaining other components are classified in the opposite segment of the first component when no remaining other component has a distance to the enlarged first component that is less than a maximum threshold distance.

By a further implementation, a computer-implemented system of background-foreground segmentation for image processing comprises at least one display; at least one memory; at least one processor communicatively coupled to the display and the memory; and a background-foreground segmentation unit operated by the processor and to: obtain pixel data comprising both non-depth data and depth data for at least one image, wherein the non-depth data comprises color data or luminance data or both and associated with the pixels; determine whether a portion of the image is part of a background or foreground of the image based on the depth data and without using the non-depth data; and determine whether a border area between the background and foreground formed by using the depth data are part of the background or foreground depending on the non-depth data without using the depth data.

The system may also include that the background-foreground segmentation unit is arranged to wherein the border area is a thin band extending around at least a portion of the border between the depth based background and foreground, and wherein the border is about 10 pixels wide; wherein non-depth data is only used to fill holes on the depth-based background and foregrounds and with the border area determination to determine the background and foreground segmentation; wherein the segmentation of the border areas is determined by using at least one of an active contour deforming energy function algorithm and an iterative graph cutting algorithm. The system also include that the background-foreground segmentation unit is arranged to: designate a first component as part of the foreground or background depending on (1) whether the component is the largest component on the image, or (2) whether the component has a largest or smallest depth relative to other individual components, or (3) both; and determine whether other components are classified as background or foreground based on a distance from the other component to the first component, wherein the area of the closest other component of the remaining other components is added to the first component and classified as part of the background or foreground when the distance is below a maximum threshold distance, wherein the area of the first component is re-established after the area of each component is added to the first component before determining the distances to the remaining other separate components, and wherein the remaining other components are classified in the opposite segment of the first component when no remaining other component has a distance to the enlarged first component that is less than a maximum threshold distance.

As another implementation, a computer-readable medium having stored thereon instructions that when executed cause a computing device to: obtain pixel data comprising both non-depth data and depth data for at least one image, wherein the non-depth data comprises color data or luminance data or both and associated with the pixels; determine whether a portion of the image is part of a background or foreground of the image based on the depth data and without using the non-depth data; and determine whether a border area between the background and foreground formed by using the depth data are part of the background or foreground depending on the non-depth data without using the depth data.

As another option, the instructions execute the computing device to: determine whether at least one component established by detecting a plane in the image is in the background or foreground; perform over-segmentation on the image without using non-depth pixel data, wherein the over-segmentation is performed on areas of the image other than those with components established by detecting planes, and by using a mean-shift algorithm; determine whether at least one component of the image is in the background or foreground depending on whether the component crosses a segmentation boundary established to indicate that segmentation of the image within the boundary is desired; merge components established by over-segmentation based on single depth values established for individual components; designate a first component as part of the foreground or background depending on (1) whether the component is the largest component on the image, or (2) whether the component has a largest or smallest depth relative to other individual components, or (3) both, wherein the first component is a first foreground component, and when a group of large components of similar size exists on the image, the large component with the smallest depth relative to the depth of the other large components is the first component; and determine whether other components are classified as background or foreground based, as least in part, on individual distances from the other components to the first component.

The instructions also may include that the area of the closest other component of the remaining other components is added to the first component and classified as part of the background or foreground when the distance is below a maximum threshold distance; wherein the distance is a 3D Euclidean distance; wherein the distance is measured from closest edge of the other component to closest edge of the first component; wherein the area of the first component is re-established after the area of each component is added to the first component before determining the distances to the remaining other separate components; and wherein the remaining other components are classified in the opposite segment of the first component when no remaining other component has a distance to the enlarged first component that is less than a maximum threshold distance.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of background-foreground segmentation for image processing, comprising:
    obtaining pixel data comprising both non-depth data and depth data for at least one image, wherein the non-depth data comprises color data or luminance data or both and associated with the pixels;
    determining whether a portion of the image is part of a background or foreground of the image based on the depth data and without using the non-depth data; and
    determining whether a border area between the background and foreground formed by using the depth data are part of the background or foreground depending on the non-depth data without using the depth data.

2. The method of claim 1 comprising determining whether at least one component established by detecting a plane in the image is in the background or foreground.

3. The method of claim 1 comprising performing over-segmentation on the image without using non-depth pixel data.

4. The method of claim 3 wherein the over-segmentation is performed on areas of the image other than those with components established by detecting planes.

5. The method of claim 3 comprising performing the over-segmentation by using a mean-shift algorithm.

6. The method of claim 1 comprising determining whether at least one component of the image is in the background or foreground depending on whether the component crosses a segmentation boundary established to indicate that segmentation of the image within the boundary is desired.

7. The method of claim 1 comprising merging components established by over-segmentation based on single depth values established for individual components.

8. The method of claim 1 comprising designating a first component as part of the foreground or background depending on (1) whether the component is the largest component on the image, or (2) whether the component has a largest or smallest depth relative to other individual components, or (3) both.

9. The method of claim 8 wherein the first component is a first foreground component, and when a group of large components of similar size exists on the image, the large component with the smallest depth relative to the depth of the other large components is the first component.

10. The method of claim 8 comprising determining whether other components are classified as background or foreground based, as least in part, on individual distances from the other components to the first component.

11. The method of claim 10 wherein the area of the closest other component of the remaining other components is added to the first component and classified as part of the background or foreground when the distance is below a maximum threshold distance.

12. The method of claim 10 wherein the distance is a 3D Euclidean distance.

13. The method of claim 10 wherein the distance is measured from closest edge of the other component to closest edge of the first component.

14. The method of claim 10 wherein the area of the first component is re-established after the area of each component is added to the first component before determining the distances to the remaining other separate components.

15. The method of claim 14 wherein the remaining other components are classified in the opposite segment of the first component when no remaining other component has a distance to the enlarged first component that is less than a maximum threshold distance.

16. The method of claim 1 comprising:
    determining whether at least one component established by detecting a plane in the image is in the background or foreground;
    performing over-segmentation on the image without using non-depth pixel data, wherein the over-segmentation is performed on areas of the image other than those with components established by detecting planes, and by using a mean-shift algorithm;
    determining whether at least one component of the image is in the background or foreground depending on whether the component crosses a segmentation boundary established to indicate that segmentation of the image within the boundary is desired;
    merging components established by over-segmentation based on single depth values established for individual components;
    designating a first component as part of the foreground or background depending on (1) whether the component is the largest component on the image, or (2) whether the component has a largest or smallest depth relative to other individual components, or (3) both, wherein the first component is a first foreground component, and when a group of large components of similar size exists on the image, the large component with the smallest depth relative to the depth of the other large components is the first component; and determining whether other components are classified as background or foreground based, as least in part, on individual distances from the other components to the first component;

wherein the area of the closest other component of the remaining other components is added to the first component and classified as part of the background or foreground when the distance is below a maximum threshold distance;

wherein the distance is a 3D Euclidean distance;

wherein the distance is measured from closest edge of the other component to closest edge of the first component;

wherein the area of the first component is re-established after the area of each component is added to the first component before determining the distances to the remaining other separate components; and wherein the remaining other components are classified in the opposite segment of the first component when no remaining other component has a distance to the enlarged first component that is less than a maximum threshold distance.

17. A computer-implemented system of background-foreground segmentation for image processing, comprising:

at least one display;

at least one memory at least one processor communicatively coupled to the display and the memory; and a background-foreground segmentation unit operated by the at least one processor and to:

obtain pixel data comprising both non-depth data and depth data for at least one image, wherein the non-depth data comprises color data or luminance data or both and associated with the pixels;

determine whether a portion of the image is part of a background or foreground of the image based on the depth data and without using the non-depth data; and determine whether a border area between the background and foreground formed by using the depth data are part of the background or foreground depending on the non-depth data without using the depth data.

18. The system of claim 17 wherein the border area is a thin band extending around at least a portion of the border between the depth based background and foreground.

19. The system of claim 18 wherein the border is about 10 pixels wide.

20. The system of claim 17 wherein non-depth data is only used to fill holes on the depth-based background and foregrounds and with the border area determination to determine the background and foreground segmentation.

21. The system of claim 17 wherein the segmentation of the border areas is determined by using at least one of an active contour deforming energy function algorithm and an iterative graph cutting algorithm.

22. The system of claim 17 wherein the background-foreground segmentation unit is arranged to:

designate a first component as part of the foreground or background depending on (1) whether the component is the largest component on the image, or (2) whether the component has a largest or smallest depth relative to other individual components, or (3) both; and determine whether other components are classified as background or foreground based on a distance from the other component to the first component, wherein the area of the closest other component of the remaining other components is added to the first component and classified as part of the background or foreground when the distance is below a maximum threshold distance, wherein the area of the first component is re-established after the area of each component is added to the first component before determining the distances to the remaining other separate components, and wherein the remaining other components are classified in the opposite segment of the first component when no remaining other component has a distance to the enlarged first component that is less than a maximum threshold distance.

23. The system of claim 17 wherein the border area is a thin band extending around at least a portion of the border between the depth based background and foreground, and wherein the border is about 10 pixels wide;

wherein non-depth data is only used to fill holes on the depth-based background and foregrounds and with the border area determination to determine the background and foreground segmentation;

wherein the segmentation of the border areas is determined by using at least one of an active contour deforming energy function algorithm and an iterative graph cutting algorithm; and wherein the background-foreground segmentation unit is arranged to:

designate a first component as part of the foreground or background depending on (1) whether the component is the largest component on the image, or (2) whether the component has a largest or smallest depth relative to other individual components, or (3) both; and determine whether other components are classified as background or foreground based on a distance from the other component to the first component, wherein the area of the closest other component of the remaining other components is added to the first component and classified as part of the background or foreground when the distance is below a maximum threshold distance, wherein the area of the first component is re-established after the area of each component is added to the first component before determining the distances to the remaining other separate components, and wherein the remaining other components are classified in the opposite segment of the first component when no remaining other component has a distance to the enlarged first component that is less than a maximum threshold distance.

24. A non-transitory computer-readable medium having stored thereon instructions that when executed cause a computing device to perform operations, the operations comprising:

obtain pixel data comprising both non-depth data and depth data for at least one image, wherein the non-depth data comprises color data or luminance data or both and associated with the pixels;

determine whether a portion of the image is part of a background or foreground of the image based on the depth data and without using the non-depth data; and determine whether a border area between the background and foreground formed by using the depth data are part of the background or foreground depending on the non-depth data without using the depth data.

25. The non-transitory computer-readable medium of claim 24 wherein the instructions cause the computing device to:
- determine whether at least one component established by detecting a plane in the image is in the background or foreground;
- perform over-segmentation on the image without using non-depth pixel data, wherein the over-segmentation is performed on areas of the image other than those with components established by detecting planes, and by using a mean-shift algorithm;
- determine whether at least one component of the image is in the background or foreground depending on whether the component crosses a segmentation boundary established to indicate that segmentation of the image within the boundary is desired;
- merge components established by over-segmentation based on single depth values established for individual components;
- designate a first component as part of the foreground or background depending on (1) whether the component is the largest component on the image, or (2) whether the component has a largest or smallest depth relative to other individual components, or (3) both, wherein the first component is a first foreground component, and when a group of large components of similar size exists on the image, the large component with the smallest depth relative to the depth of the other large components is the first component; and
- determine whether other components are classified as background or foreground based, as least in part, on individual distances from the other components to the first component;
- wherein the area of the closest other component of the remaining other components is added to the first component and classified as part of the background or foreground when the distance is below a maximum threshold distance;
- wherein the distance is a 3D Euclidean distance;
- wherein the distance is measured from closest edge of the other component to closest edge of the first component;
- wherein the area of the first component is re-established after the area of each component is added to the first component before determining the distances to the remaining other separate components; and
- wherein the remaining other components are classified in the opposite segment of the first component when no remaining other component has a distance to the enlarged first component that is less than a maximum threshold distance.

* * * * *